Nov. 22, 1938.  G. McD. JOHNS  2,137,405
GEM CUTTING MACHINE
Filed April 27, 1936  3 Sheets-Sheet 1
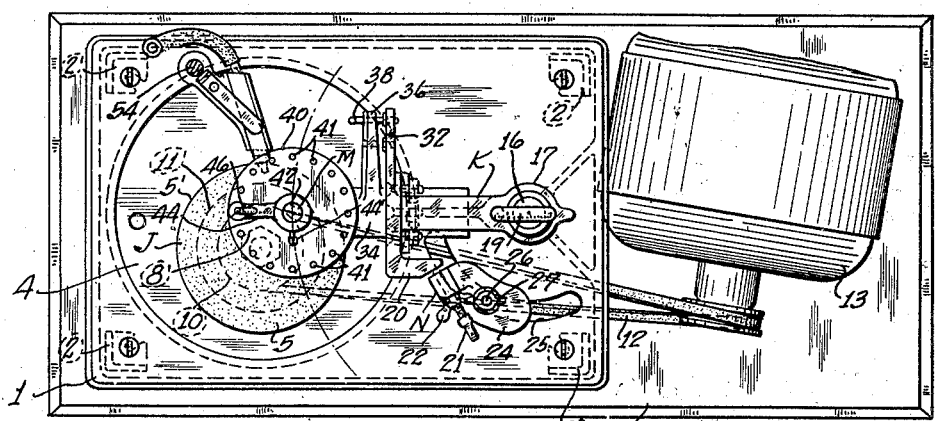
Fig. 1.
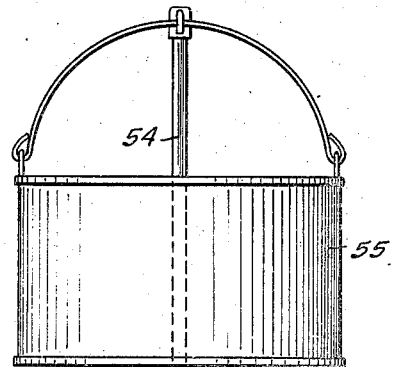
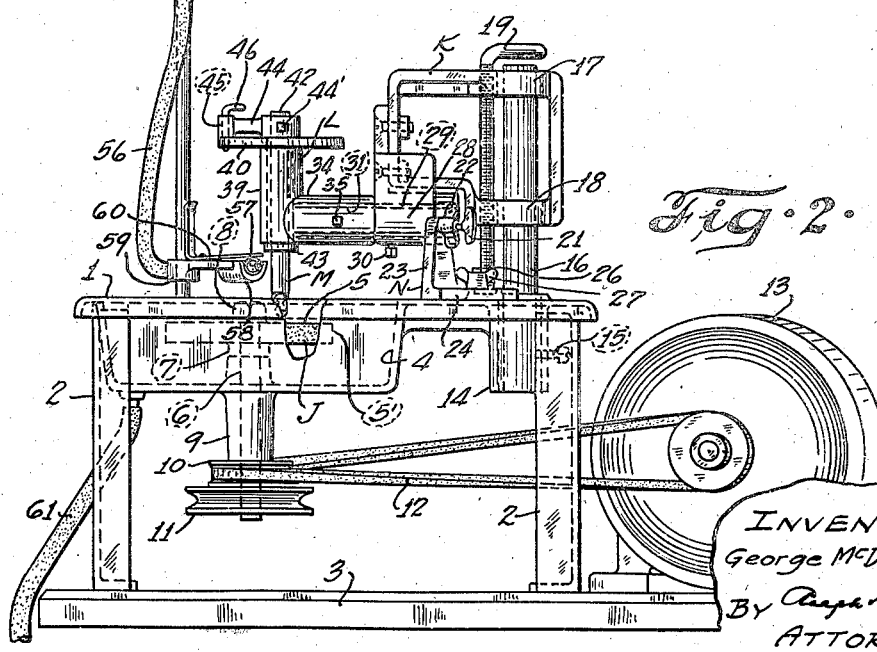
Fig. 2.
INVENTOR
George McD. Johns.
BY
ATTORNEY

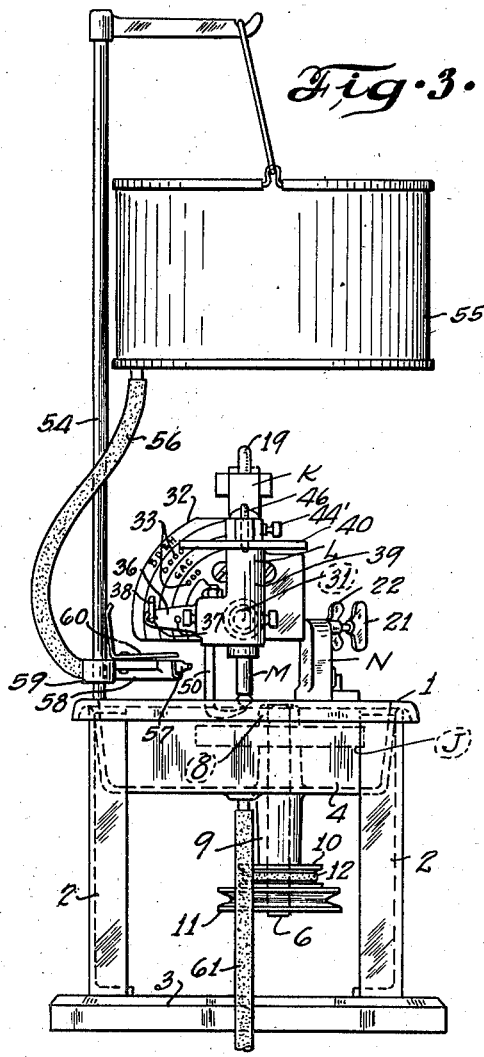

INVENTOR
George McD. Johns.
BY
ATTORNEY

Patented Nov. 22, 1938

2,137,405

UNITED STATES PATENT OFFICE 2,137,405

GEM CUTTING MACHINE

George McD. Johns, St. Louis, Mo.

Application April 27, 1936, Serial No. 76,600

3 Claims. (Cl. 51—124)

This invention relates generally to the lapidary art and has more particular reference to a gem cutting machine, that is to say, a machine for effecting the precision cutting of facets or faces on substantially all varieties of stones, ordinary, precious, or semi-precious and the like.

For the best effect, each facet of a gem should be truly plane with the lateral edges and the apices of the facets well and sharply defined. The stone or gem is usually cut into the form of a convex polyhedron, and the cutting operation, when performed by hand, requires a high degree of dexterity and skill, the regularity of the resulting pattern of the gem being, in any event, subject to the usual imperfections associated with hand work.

My present invention has for its prime object the provision of a gem-cutting machine wherein such mechanical aids are introduced as to enable a person of merely ordinary skill and experience to effect the precision cutting of a regular pattern of facets or faces on precious or semi-precious stones and the like.

And with the above and other objects in view, my invention resides in the novel features of form, construction, arrangement, and combination of parts presently described and pointed out in the claims.

In the accompanying drawings (three sheets)—

Figure 1 is a top plan view of a gem or stone cutting machine of my invention;

Figure 2 is a partly broken side elevational view of the machine;

Figure 3 is a front elevational view of the machine;

Figure 4 is an enlarged fragmentary view of the gem-holder with the gem-retainer in use for retaining the gem on the holder during a cutting operation, other parts of the machine being omitted;

Figures 5 and 6 are, respectively, side elevational views of cut stones or gems, such as may be readily produced on the machine;

Figure 7:
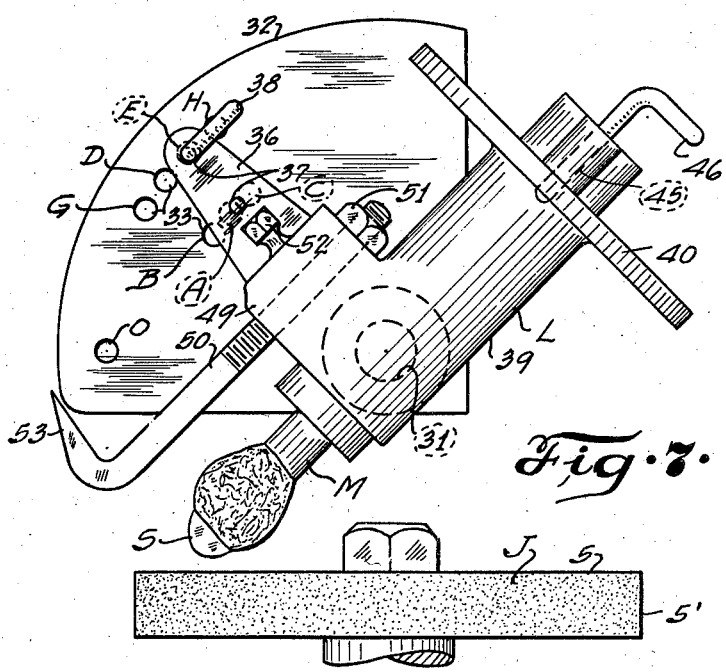
Figure 7 is an enlarged fragmentary front view showing the gem-working wheel, the gem-holder, the head, and its index-plates during one stage of cutting the gem, other parts of the machine being omitted.

Referring now more in detail and by reference characters to the drawings, which illustrate a preferred form of the invention, the machine includes a main frame comprising a horizontal work-table 1 preferably approximately rectangular in contour, supported by suitable legs 2 on a base-plate 3, the table 1 being provided adjacent one of its margins with a circular depressed portion or basin 4.

In the basin 4 is disposed the revolvable gem-cutting element or wheel J having a flat upper or face-grinding surface 5 and a peripheral circular or edge-grinding surface 5', the latter for a purpose presently appearing and the former providing the reference plane for the work. It may be here stated that, in actual practice, several similar wheels J are employed, each, however, of a composition suitable for the purpose of working the rough gem stone into its final faceted and polished condition. For example, the several wheels J may be composed, respectively, of carborundum, iron, and lead, the principle involved being the use of successively softer materials in the particular wheel employed during the progress of the work through its several steps or stages, as well understood in the lapidary art, and not here deemed necessary of further description.

The particular wheel J is removably mounted on the upper end of a spindle 6 disposed preferably off center or eccentrically of the basin 4 and having its axis perpendicular to the reference plane 5 of the wheel J. Preferably the spindle 6 has a collar 7 for supporting the wheel J with the working surface 5 below the rim of the basin 4, in order that any debris thrown off the wheel J may be caught in the basin 4 and removed, as will presently appear, the wheel J being removably retained on the spindle 6 by a suitable fastening element or nut 8 threaded onto the upper end of the spindle 6.

The spindle 6 is suitably journalled in a vertical bearing 9 provided in and through the bottom or end wall of the basin 4, the collar 7 resting on the upper end of the bearing 9. The arbor or spindle 6 at its lower end depends below the bearing 9 for supporting a suitable number of pulleys, as 10, 11, selectively engageable by a belt 12 actuable by means including a suitable prime-mover in the form of an electric motor 13 for motivating the wheel J with the desired speed and direction of rotation.

Provided in the end or marginal portion of the table 1, oppositely from the basin 4, is a socket 14 equipped with a set-screw 15 for removably retaining therein an upstanding pillar or pivot-column 16, whose axis is accurately perpendicular to the reference plane 5 of the wheel J.

Swingably mounted on the column 16, is a radially disposed arm K comprising, in the present instance, a substantially rectangular skeleton frame having two or more vertically spaced bearings 17, 18, slidable on, and pivotally engaging, the column 16 for insuring that the swingable traverse of the arm or frame K will be truly perpendicular to the column 16 and hence precisely parallel with the reference plane 5 of the wheel J.

A handled elevating screw 19 is suitably threaded vertically through the arm K for bearing at its lower end on the table 1, by means of which the arm K may be adjustably shifted on the column 16 for disposing the arm K at the desired or selected elevation above the reference plane 5 of the wheel J.

The swingable movement of the arm K on the column 16 may be limited by means of a table-mounted stop N co-operable with a laterally extending lug 20 provided on the arm K, the stop N comprising a stop-screw 21 equipped with a wing-type jam-nut 22 adjustably threaded horizontally through a stop-arm 23 upstanding from a shoe 24, which works in an arcuate dovetail slot 25 provided in the table 1 and centered on the column 16. A suitable T-bolt 26, equipped with a wing-type jam-nut 27, is employed in the customary manner for adjustably positioning the shoe 24 in the slot 25.

On the free end of the arm or frame K, is suitably fixed a hub 28 having a bore 29 and equipped with a set-screw 30 for removably retaining therein a trunnion 31, which, projecting radially from the arm K, has its axis disposed parallel with the reference plane of the wheel J.

Fixed to and extending laterally outwardly from the free end of the hub 28, as best seen in Figure 1, is a so-called polyhedral-angle measuring or index-plate 32 provided with a plurality of index-apertures 33, each identified by appropriate indicia, as A, B, C, D, E, G, H, and O, for a purpose presently more particularly described, and of which it may here merely be said that each aperture 33 defines or measures a definite angular relationship between a radial line connecting the particular aperture with the axis of the trunnion 31 and the reference plane 5 of the wheel J.

Swingably disposed at the end of the hub 28, is a head L, which includes a sleeve 34, removably journalled on the trunnion 31 and equipped with a set-screw 35 for securing the head L firmly on the trunnion 31 when it is desirable so to do.

Extending laterally from, and at right angles to, the axis of the trunnion 31, is an index-arm 36 provided with a plurality of apertures 37 disposed for registration with one or more of the apertures 33, the arm 36 being equipped with a removable index-pin 38, which, when selectively inserted in one of the arm-apertures 37 for engaging a particular plate-aperture 33, serves, as will be readily understood, for positioning the head L also in a corresponding angular relationship with respect to the reference plane 5 of the wheel J.

The head L further includes a hub 39 having its axis perpendicular to the sleeve 34 and also to the axis of the trunnion 31. At its one or normally upper end, the hub 39 supports a preferably circular so-called dihedral-angle or facet index-plate 40, which is disposed horizontally to the axis of the hub 39 and provided with a circumferential series of spaced facet-index apertures 41, of which at this time it may merely be said that each pair of adjacent apertures 41 define or measure a definite degree of circular measure, preferably an aliquot part of a circle.

A spindle 42, journalled in the hub 39, has at its lower end a collar 43, which engages the lower end of the hub 39, and at its upper end carries an arm 44, the hub of which is equipped with a set-screw 44' for removably engaging the arm 44 on the spindle 42, whereby the latter is, in turn, removably retained in the hub 39.

The arm 44 is provided with an aperture 45 disposed for registration with the respective facet index-apertures 41 and is equipped with a removable index-pin 46 for engaging a particular aperture 41 for disposing the arm 44 and its attached spindle 42 in a selected definite angular position about its own axis with respect to the axis of the head L.

The spindle 42 is extended downwardly to provide a work-holder M, which, in turn, at its lower end, is provided with an axially disposed cone-socket or conical recess 48 for receiving the stone being cut, as will presently more particularly appear.

Extending laterally from the lower end of the hub 39, is a lug 49 having a bore 49', whose axis is parallel with the axis of the spindle 42 and in which is slidably disposed the stem portion of a hook-member or so-called gem-retainer 50 threadedly engaged at its upper end by a fastening element or nut 51 for a purpose soon appearing, the lug 49 being equipped with a set-screw 52 for removably securing the retainer 50 therein. The retainer 50, at its lower end, terminates in a lateral bill or hook 53 adapted, on suitable manipulation of the retainer 50, to reside in registration with the axis of the holder M.

During some stages of the gem-cutting operation, it is desirable to wash the surface of the wheel J with a stream of water, for which purpose a vertical standard 54 is mounted on the table 1 for supporting a bucket 55 equipped with a suitable flexible outlet conduit or rubber hose 56 terminating in a nozzle 57 supported in a trough 58 projecting from a hub 59 slidably engaging the stand 54 and frictionally retained thereon by means of a resilient element or spring 60.

By suitably disposing the nozzle 57, a stream of water, flowing by gravity from the bucket 55, may be caused to play upon the wheel J, the wash-water being caught in the basin 4 and removed therefrom through a suitable drain-conduit 61.

In describing the use of the machine, it may be briefly pointed out that the gem is preferably cut in the form of a convex-polyhedron, of which each circumferential series of facets may be considered as referenced to the frustrum of a regular prism or pyramid, as the case may be, the polyhedral angle of which is accurately set off by indexing the head L to an appropriate index-aperture 33 in the angle-index plate 32, and the dihedral angles of which are set off by indexing the holder M to successive appropriate index-apertures 41 in the facet-index plate 40, and, the stone to be cut having been mounted on, and with the principal axis of the finished gem aligned with the axis of, the holder M, the co-ordinate axes of the gem-facets, both of, and about, the principal axis of the gem, are thus predetermined with respect to the reference plane 5 of the wheel J with the precision requisite for the successful performance of the gem-cutting operation.

Under such circumstances, when the elevating screw 19 is manipulated for applying the stone to be cut to the revolving surface of the wheel J, a series of flat surfaces or faces may be formed on the stone by successively rotating the holder M in the head L without changing the position of the latter, which several faces, if joined at their lateral edges, will provide one set of the facets of the finished gem.

If, now, the head L be rotated on the arm K, the angle of inclination of the principal axis of the gem will be changed with respect to the reference plane of the wheel J, whereupon, the stone being again applied to the wheel J, so as to truncate the first formed facets at their lateral edges, other series of facets are formed of varying contour, as triangles, trapeziums, and the like, according to the nature or "cut" of the gem being formed.

Assume, for example, it is desired to form a gem with the "cut" as shown in Figure 5. This gem is composed of a crown or upper portion 62 and a collet or lower portion 63 joined by a girdle 64.

The crown 62 is composed of a flat eight-sided table or top facet O', from each side of which extends an inclined inverted triangular face or facet G' having its point resting on the girdle 64, and between each pair of facets G' there is erected from the girdle 64 an inclined triangular face or facet D' having its point resting on a corresponding apice of the table O'.

The collet 63 is composed of an eight sided pyramid formed by a lower series of facets E', each of which is a trapezium, and an upper series of inverted triangular facets H', each of which has its base resting on the girdle 64 and its point resting on one of the lateral edges of the series of facets E'.

For cutting such a gem, the angle-index plate 32 is provided with five of the apertures 33, designated as G, D, E, H, and O, and these several apertures are so disposed that, when the head L is indexed to the aperture O, the work-holder M will be truly perpendicular to the reference plane of the wheel J for cutting the facet O'; when the head L is indexed to the aperture B, the holder M will be disposed in such angular relationship to the reference plane as to reside in the axis of an imaginary regular pyramid which circumscribes the facets G', so that, when the stone is engaged with the wheel A, each facet G' will be a portion of a lateral side of such a pyramid; and so on for the other apertures D, E, H, and the corresponding facets D', E', and H', respectively.

In practice, it is preferable, in forming the gem, to first cut the collet 63, for which purpose the stone, as S, having first been rough shaped by hand manipulation on the wheel J, is mounted on the holder M, and the head L is indexed to the hole E on the angle-index plate 32, which, as will be understood, disposes the holder M at an inclination to the reference plane of the wheel J coinciding with the axis of the fundamental polyhedral pyramid which defines the facets E' of the collet 63, the several parts then assuming the position shown in Figure 7.

Preferably, the holder M is not at first indexed to any particular aperture 41 in the facet-index plate 40, but the arm K is carefully lowered on the column 16 with the aid of the elevating screw 19 for bringing the stone S into engagement with the wheel J; and the holder M is rotated in the head L until the stone S is worked into the shape of a cone which circumscribes the mentioned fundamental pyramid.

Subsequently, it is a relatively simple matter to cut the lateral faces of the fundamental pyramid on the stone S by suitably indexing the holder M on the facet index-plate 40.

The total number of index-apertures 41 provided in the plate 40 will depend upon the size of gem which it is intended to work in the machine. In the present instance, the plate 40 is shown with sixteen equally spaced apertures 41, so that, if desired, sixteen facets may be formed on the stone by indexing the holder M to successive apertures 41.

However, in cutting the gem of Figure 5, merely eight of the facets E' are formed; hence the holder M is indexed to successive alternate apertures 41 until the complete circumferential series of eight lateral sides of the fundamental pyramid are formed.

For cutting the facets H', the head L is indexed to the hole H on the angle index-plate 32, which disposes the holder M in the axis of a pyramid which defines the facets H', and the holder M being indexed to those facet-index apertures 41 which are respectively intermediate, or bisect, the pairs of alternate apertures 41 previously used when cutting the fundamental pyramid, the circumferential series of faces H' are formed, which will truncate the lateral edges of the fundamental pyramid and thereby form or complete the trapezium shaped facets E'.

Figure 8:
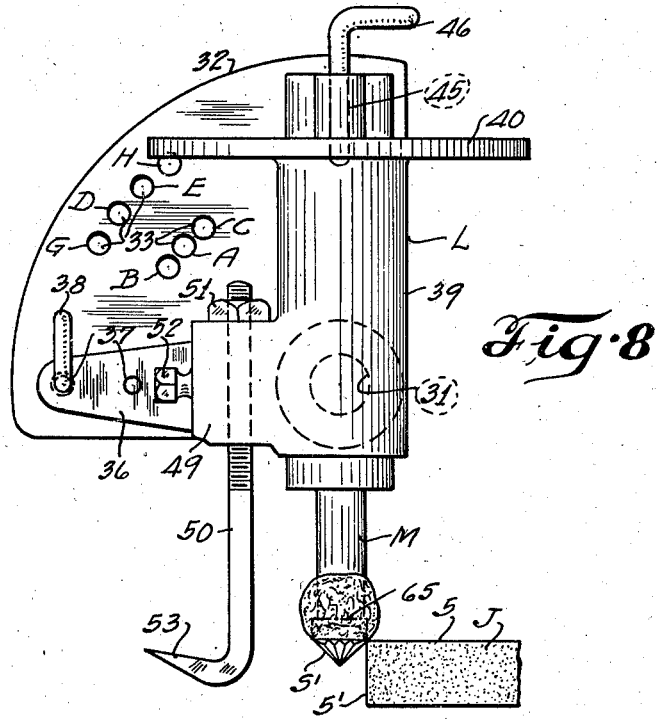
Figure 8 is a view similar to Figure 7, illustrating another stage of the gem-cutting operation.

The head L being indexed in the aperture O of the plate 32, so as to dispose the holder M perpendicular to the reference plane of the wheel J, the stop N is adjusted so that, when the arm K impinges the stop, the partially cut stone S' will be disposed with the upper apices of the facets E' just in engagement with the edge-grinding surface of the wheel J, as best seen in Figure 8, whereupon, the stone S' being revolved and also shifted, with the aid of the elevating screw 19, vertically downwardly on the edge-grinding face 5' of the wheel, a right circular cylinder 65, as shown by the dash lines of Figure 8, is formed on the stone S', which cylinder 65 circumscribes the crown 62 of the finished gem.

The partially finished stone S'' is removed from the holder M and remounted thereon with the aid of an adhesive 66, in inverted position, with the collet portion 63 disposed in the cone-socket 48 of the holder and the adhesive 66 embracing the cylinder 65, so as to retain the stone firmly on the holder M. The holder M being still in its vertical position, the stone S'' is applied to the face-grinding surface 5 of the wheel J for rough shaping the end of the cylindrical portion 65 of the stone to a right plane surface 67, as best seen in Figure 4.

The excess of the adhesive 66 is then cut away for exposing the cylinder 65, as will be understood from the dot-dash lines of Figure 4. This weakens the grip of the adhesive 66 on the stone S'', and, in order that the stone may not become displaced from its proper position on the holder M, the retainer 50 is turned in the hub 49 until the hook 53 is in registration with the holder M, whereupon, the nut 51 being suitably manipulated, the point of the hook 53 is drawn against the face 67 of the stone S'', the retainer 50 being secured against movement with the aid of the set-screw 52, as best seen in Figure 4.

The cutting of the facets D' and G' is performed in the order named in a manner analogous to the cutting of the facets E' and H'. The polyhedral angles of the crown 62 are, in the present instance, different from those of the collet 63, which is provided for by the proper location of the angle-index apertures D and G in the index-plate 32, as best seen in Figure 3.

The gem is completed by turning the retainer 50 away from its engagement with the stone, and then, after indexing the head L to the index-aperture O on the plate 32, grinding the flat face 67 until it meets the apices of the facets D′, thereby forming the eight-sided table or facet O′ of the gem.

Figure 6 depicts a gem having a "cut" comprising a crown 68, a collet 69, and a girdle 70. The surface of this gem consists of a central eight-sided facet O″ cut by indexing the head L to the index-aperture O, eight triangular facets B″ similarly associated with the index-aperture B, eight trapeziums A″, for which the aperture A is used, and then a series of sixteen triangles C″ indexed to the aperture C.

The collet side 69 consists of a series of trapeziums D″ indexed to the aperture D and a smaller series of sixteen triangles E″, which are cut by indexing the head L to the aperture E in the index-plate 32.

It is to be understood that, after rough cutting a particular facet-series with a carborundum type of wheel J, each facet is smoothed with an iron type of wheel, using a suitable liquid abrasive, and then polished by means of a lead type of wheel J, first with a liquid abrasive and then using merely water as a lubricant.

I might add that all precious or semi-precious gem-stones may be cut on my machine, although, of course, when cutting the diamond, it is requisite to employ diamond dust as the abrasive.

These details, however, and others of like nature, are well known to those familiar with the lapidary art and are not here deemed necessary of more particular description.

The machine is of simple, inexpensive structure, is easy and convenient of operation, durable and sturdy, and precise and efficient in the performance of its intended functions, and it is to be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is:

1. In a gem-cutting machine, in combination, a base, a rotary gem-working element operably mounted on the base and having an upwardly presented face providing a reference plane, a table having an upwardly presented face lying parallel to said reference plane, a post mounted rigidly on the base perpendicularly to and extending upwardly from the reference plane, a frame shiftably supported on the post for swingable and freely slidable movement about an axis perpendicular to the plane, means threadedly mounted in the frame and at its lower end having sliding engagement with the upwardly presented table-face for adjustably limiting the downward vertical movement of the frame along the post and with respect to the reference plane, a stop shoulder shiftably mounted on the base and having an upwardly extending shoulder for abutting engagement with a side face of the frame for adjustably limiting the swingable movement of the frame in one direction, and gem-holding means adjustably mounted on and extending radially outwardly from the frame.

2. In a gem-cutting machine, in combination, a rotary gem-working element having an upwardly presented face providing a reference plane, a table having an upwardly presented face lying parallel to said reference plane, a post mounted perpendicularly to and extending upwardly from the reference plane, a frame shiftably supported on the post for swingable and freely slidable movement about an axis perpendicular to said plane, means threadedly mounted in the frame for sliding engagement at its one end with said upwardly presented table face for adjustably limiting the downward sliding movement of said frame, a rigid hub projecting radially from the frame and lengthwise disposed in parallelism with said plane, a trunnion mounted lengthwise in the hub, a sleeve journalled for rotary movement on the trunnion, an index-plate projecting laterally from and fixed to the hub, a workholder supporting head fixed to the sleeve and axially disposed perpendicularly to the trunnion, a rigid arm extending laterally from the sleeve at right angles to the trunnion, and means for adjustably engaging the arm with the plate for measuring the angular movement of the head.

3. In a gem-cutting machine, in combination, a rotary gem-working element having an upwardly presented face providing a reference plane, a table having an upwardly presented face lying parallel to said reference plane, a post mounted perpendicularly to and extending upwardly from the reference plane, a frame shiftably supported on the post for swingable and freely slidable movement about an axis perpendicular to said plane, means threadedly mounted in the frame for sliding engagement at its one end with said upwardly presented table face for adjustably limiting the downward sliding movement of said frame, a rigid hub projecting radially from the frame and lengthwise disposed in parallelism with said plane, a trunnion mounted lengthwise in the hub, a sleeve journalled for rotary movement on the trunnion, an index-plate projecting laterally from and fixed to the hub, a work-holder supporting head fixed to the sleeve and axially disposed perpendicularly to the trunnion, a second index-plate fixed on the head at right angles to the work-holder, a rigid arm extending laterally from the sleeve at right angles to the trunnion, and respective means for adjustably engaging said arm with the first plate and the work-holder with the second plate for measuring the angular movements of the head and the work-holder.

GEORGE McD. JOHNS.